F. L. WARNKE.
KNIFE.
APPLICATION FILED FEB. 16, 1918.
1,266,186.
Patented May 14, 1918.
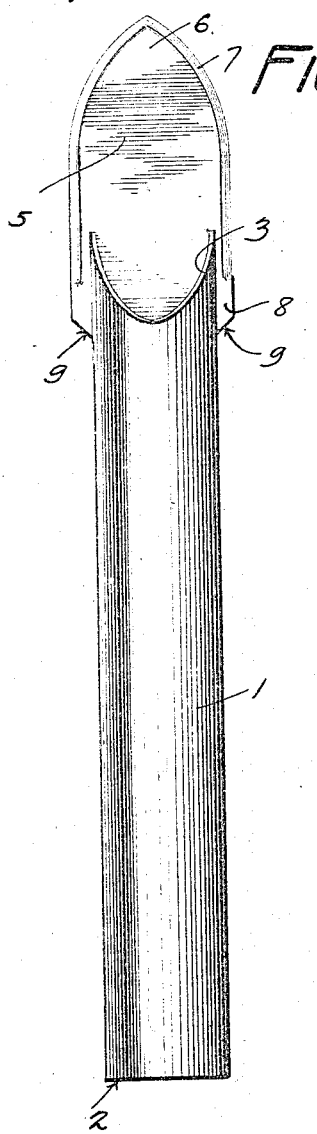
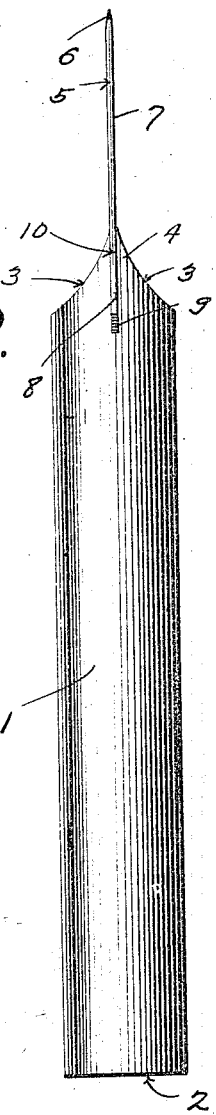
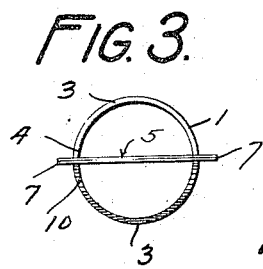
WITNESSES
INVENTOR
Fredrick L. Warnke
BY
ATTORNEY

UNITED STATES PATENT OFFICE.

FREDRICK L. WARNKE, OF COOPERSVILLE, MICHIGAN.

KNIFE.

1,266,186.  Specification of Letters Patent.  Patented May 14, 1918.

Application filed February 16, 1918. Serial No. 217,532.

*To all whom it may concern:*

Be it known that I, FREDRICK L. WARNKE, a citizen of the United States, residing at Coopersville, in the county of Ottawa and State of Michigan, have invented certain new and useful Improvements in Knives, of which the following is a specification.

This invention is a knife and has special reference to knives commonly known as sticking knives used for butchering.

One object of this invention is the production of a sticking knife which is constructed so as to facilitate the driving thereof into the neck of the animal being butchered, the construction of the knife permitting of its retention by the neck of the animal so as to allow the animal to bleed freely while dying.

Another object of this invention is the production of a sticking knife which includes a hollow handle having a blade carried at one end thereof, thus permitting the blade to be driven into the neck of the animal being butchered and then permitting the inner end of the handle to be moved into the wound, thus formed by the blade, thus preventing the closing of the wound and at the same time permitting the blood to flow freely through the wound which is held open, whereby the animal will properly bleed while dying to prevent the spoiling of the meat due to the retention of blood thereby.

The invention consists broadly in providing a cylindrical elongated handle which is tapered in a wedge like manner at one end, a blade carried by the tapered end of the handle, said blade having beveled cutting edges extending therearound, thus facilitating the driving of the blade into the neck of the animal, while the tapering end of the handle will force itself into the wound, thus holding the wound open and permitting the blood to pass through the handle to be discharged.

With these and other objects in view, this invention consists of certain novel combinations, constructions, and arrangement of parts, as will be hereinafter fully described and claimed.

One practical form of construction and assembly of the present invention will be hereinafter described, and is herein illustrated, reference being had to the drawing, in which—

Figure 1 is a side elevation of the knife as constructed in accordance with the present invention.

Fig. 2 is a side elevation of the knife, taken at right angles to Fig. 1.

Fig. 3 is an end elevation of the forward end of the knife.

Referring to the accompanying drawing by numerals, it will be seen that the knife comprises an elongated cylindrical handle or grip 1 which may have a squared outer end 2 to prevent injury to the hand of the user. The opposite end of the cylindrical handle 1, is beveled inwardly toward the center of the knife, as shown at 3, thus disclosing a substantially wedge like construction having an apex 4.

The blade 5 is substantially diamond shaped, although the sides thereof are parallel for a slight distance, thus constituting a pointed end 6. The side edges 7 of the blade are beveled from the point 6 to points adjacent the heel 8. The rear end of the blade is provided with converging edges 9, as illustrated clearly in Fig. 1. The handle 1 is provided with an inwardly extending slot at one end, this slot extending inwardly from the apex 4 for a considerable distance so that the inner end of the slot will be in a transverse plane beyond the plane extending evenly across the rear end of the beveled edges 3 of the handle.

The blade 5 is slipped into the slot at each side of the handle 1 and for this reason owing to the beveled construction of the edges 3, the edges 3 will extend from a point adjacent the surface of the blade 5 to the sides of the handle 1. Furthermore, it will be seen that the handle extends for considerable distance upon each side surface of the blade 5 and for this reason the blade 5 will be positively held from being tilted or tend to extend to either side of the handle 1.

Furthermore, by having the edges 9 at the heel of the blade 5 converging as above specified, it will be obvious that these edges extending into the interior of the handle, will hold the blade from shifting to either side of the handle by passing through the slot at either side of the handle. It is therefore obvious that this blade may be of a detachable construction, thus facilitating its removal and its sharpening, or if so desired the handle may be clamped upon the blade or some suitable retaining means, such for instance, as solder may be employed for holding the blade in fixed engagement with the handle.

It has been found, from practical experience, that in connection with butchered animals, such for instance as hogs, the hog is stuck with a knife and then after the removal of the knife the wound closes and prevents the free bleeding of the hog. As a result, the hog will live for considerable time after the wound has been inflicted and then will finally die with the wound practically closed so that instead of the removal of the blood, the blood is still retained in the flesh and this will cause the flesh or meat to spoil in a comparatively short time. By using the present invention however, this objectionable feature is overcome.

In using the present invention the blade is forced into the neck of the animal to sever the jugular vein and it is obvious that the cutting edges of the blade will cause this blade to move freely inwardly. The beveled edges 3 forming the wedge like construction at the forward end of the handle will then pass into the wound caused by the blade 5 and as the wedge like construction at the inner or forward end of the handle passes into the wound the wound of course will be retained in an open condition, thus causing the blood to flow freely through the handle of the knife. The knife is allowed to remain in the neck of the animal and for this reason the animal will not only be killed quickly, but the blood will be removed from the meat and in this way the meat will be prevented from spoiling quickly.

From the foregoing description, it will be seen that a very simple and yet efficient sticking knife has been produced, which will facilitate its insertion into the neck of an animal and will then cause the wound to be held in an open condition and will provide a conducting means in the nature of a hollow cylindrical handle through which the blood may freely flow.

As only one practical form of the present invention has been herein described and illustrated, it is obvious that many minor changes may be made in construction, as long as these changes do not exceed the scope of the device as claimed.

What is claimed is:

1. In a knife of the class described, the combination of a blade, said blade having cutting edges, said blade also having converging edges at its inner end, a hollow handle beveled from each side adjacent one end to form a wedge like construction, said handle having a slot extending into each side thereof from the outer end of its wedge like construction, said blade being slipped into said slots, whereby said handle will bear upon each side of the blade, while the converging edges of the blade will engage the inner portions of the handle adjacent the slots thereof, thus causing the blade to be held against accidental movement.

2. In a knife of the class described, the combination of a hollow handle, said handle being provided with inwardly beveled portions at one end thereof, thus forming a wedge like construction having an apex, said wedge like construction having inwardly extending slots projecting thereinto from the apex, a flat blade having cutting edges, said blade having a heel at its inner end, the inner edges of said heel converging, said blade being slipped into the slots, thus causing the handle to bear upon opposite sides of said blade, while said heel will engage the inner portion of the handle adjacent said slots, thus causing the blade to be held against accidental displacement.

3. In a device of the class described, the combination of a handle having inwardly beveled portions at one end, thus forming a wedge like construction provided with an apex, said wedge like construction being inwardly slotted from the apex, a flat blade having cutting edges, said blade having a heel at its inner end, the inner edges of said heel converging, said blade being slipped into the slotted portion of said handle, thus causing the handle to bear upon the opposite sides of said blade at the heel thereof, thus causing the blade to be held against accidental displacement.

4. In a knife of the class described, the combination of a blade having cutting edges, a hollow handle having slotted portions, said blade fitting within the slotted portions to be directly carried by said handle independent of secondary securing elements.

5. In a knife of the class described, the combination of a hollow handle, said handle being beveled at one end, to form a wedge like construction, said handle having slots extending from the wedge like construction inwardly for a short distance, a blade having outer cutting edges fitting within said slots, thus causing the blade to be directly carried independent of secondary means upon said handle, the beveled portions of said handle terminating at the surface of said blade.

6. In a knife of the class described, the combination of a hollow handle having slots formed in one end thereof, a flat blade having cutting edges, said blade having a heel at its inner end, the inner edges of said heel converging, said blade fitting within said slots, thus causing the handle to bear upon the opposite sides of said blade, while said heel will engage the inner portion of the handle adjacent said slots, thus causing the blade to be held against accidental displacement.

In testimony whereof I affix my signature in presence of two witnesses.

FREDRICK L. WARNKE.

Witnesses:
WILLIAM H. ERNEST,
CHARLEY SWANSON.